United States Patent
Laga et al.

(10) Patent No.: US 10,021,165 B2
(45) Date of Patent: Jul. 10, 2018

(54) METHOD OF SHARING BROWSING ON A WEB PAGE DISPLAYED BY A WEB BROWSER

(71) Applicant: ORANGE, Paris (FR)

(72) Inventors: Nassim Laga, Choisy le Roi (FR); Remi Hollender, Issy les Moulineaux (FR)

(73) Assignee: Orange, Paris (FR)

( * ) Notice: Subject to any disclaimer, the term of this patent is extended or adjusted under 35 U.S.C. 154(b) by 188 days.

(21) Appl. No.: 14/738,668

(22) Filed: Jun. 12, 2015

(65) Prior Publication Data

US 2015/0373081 A1   Dec. 24, 2015

(30) Foreign Application Priority Data

Jun. 20, 2014 (FR) ...................................... 14 55731

(51) Int. Cl.
*H04L 29/08* (2006.01)
*H04L 12/58* (2006.01)
(Continued)

(52) U.S. Cl.
CPC ........ *H04L 67/02* (2013.01); *G06F 17/30873* (2013.01); *H04L 51/046* (2013.01); *H04L 65/403* (2013.01)

(58) Field of Classification Search
CPC ..... H04L 67/02; H04L 51/046; H04L 65/403; G06F 17/30873
See application file for complete search history.

(56) References Cited

U.S. PATENT DOCUMENTS

| | | | |
|---|---|---|---|
| 2005/0091572 A1* | 4/2005 | Gavrilescu | ........ G06F 17/30873 715/205 |
| 2008/0052377 A1 | 2/2008 | Light | |

(Continued)

OTHER PUBLICATIONS

Edholm, WebRTC Is Peer-to-Peer, Not Browser-to-Browser, Jul. 16, 2013, WebRTC News, 2 Pages.*

(Continued)

*Primary Examiner* — Brian J Gillis
*Assistant Examiner* — Amy Ling
(74) *Attorney, Agent, or Firm* — Haverstock & Owens LLP

(57) ABSTRACT

A method of sharing browsing on a web page displayed in a window of a first web browser executed in a first terminal, with at least one second web browser executed in a second terminal. The method comprising:
- the second browser obtaining (S23) a video stream that is being played back in the first terminal, said stream including the display data of the web page;
- playing back (S24) the video stream in a playback zone included in a window of the second browser;
- on detecting (S25) at least one action triggered by a user of the second terminal and applied to at least one graphics element displayed within the play back zone, obtaining (S26, S27) information about the location of the action by evaluating the position of the graphics element relative to a reference frame associated with the display zone of the web page in the window of the first browser;
- transmitting (S28) a message to the first browser, which message includes an action type associated with the detected action together with the information about the location of the action; and (Continued)

applying (S29) the action to the web page (WP1) in the window of the first web browser as a function of the content of the message.

20 Claims, 4 Drawing Sheets

(51) Int. Cl.
*H04L 29/06* (2006.01)
*G06F 17/30* (2006.01)

(56) References Cited

U.S. PATENT DOCUMENTS

| | | | | |
|---|---|---|---|---|
| 2009/0185720 | A1* | 7/2009 | Kurpinski | G06T 3/4038 382/106 |
| 2010/0082769 | A1* | 4/2010 | Bertin | G06F 17/3089 709/217 |
| 2010/0218105 | A1* | 8/2010 | Perov | G06F 17/30873 715/738 |
| 2012/0210243 | A1* | 8/2012 | Uhma | G06F 17/30893 715/744 |
| 2013/0328997 | A1* | 12/2013 | Desai | H04N 7/141 348/14.02 |
| 2014/0129622 | A1* | 5/2014 | Michaeli | G06Q 10/10 709/203 |
| 2014/0219167 | A1* | 8/2014 | Santhanam | H04W 28/0268 370/328 |
| 2015/0106527 | A1* | 4/2015 | Li | H04L 67/02 709/227 |
| 2015/0188956 | A1* | 7/2015 | Chauhan | G06Q 30/016 726/7 |
| 2015/0269229 | A1* | 9/2015 | Shenoy | G06F 17/30525 715/233 |
| 2017/0185368 | A1* | 6/2017 | Handrigan | G06F 3/1454 |

OTHER PUBLICATIONS

Sam Dutton: "Getting Started with WebRTC", http://www.html5rocks.com/en/tutorials/webrtc/basics, 2012 (Jul. 23, 2012), pp. 1-30.

"WebRTC Tab Content Capture—The Chromium Projects", (Aug. 14, 2012), pp. 1-5, http://www.chromium.org/developers/design-documents/extensions/proposed-changes/apis-under-development/webrtc-tab-content-capture.

* cited by examiner

US 10,021,165 B2

METHOD OF SHARING BROWSING ON A WEB PAGE DISPLAYED BY A WEB BROWSER

TECHNICAL FIELD

The invention relates in general manner to real time communication between web browsers on a communications network such as the Internet.

The invention relates in particular to shared browsing, also known as "co-browsing", on a web page displayed in a window of a first web browser executed in a first terminal, with at least one second web browser executed in a second terminal.

In a particular application, the invention may be used in the context of communication between a customer and a remote adviser via a customer relationship management platform.

STATE OF THE ART

Navigating on the worldwide web of the Internet consists in consulting data files, referred to as "web pages", that are formatted using a markup language such as hypertext markup language (HTML) or extensible markup language (XML). Web pages are generally organized in web sites that are hosted by servers on the network.

A web browser is a software application installed in a user's communications terminal, such as a personal computer, and it makes it possible to "browse" various web sites and see the web pages situated at those web sites. Such browsing makes use of communications protocols such as hypertext transfer protocol (HTTP).

In this context, co-browsing on the Internet—also referred to as joint browsing—consists in making it possible for two or more people to see the same web page simultaneously.

By way of example, patent document US 2005/0091572A1 describes a method of co-browsing web sites. In the method described, a co-browsing session is first initiated between a first client (a computer having a web browser) of a first user and a second client of a second user. The first user is initially leader of the session and browses a web site using the first client, which sends a synchronization message to the second client, which message contains one or more commands specifying a browsing action executed by the first user on the first client. When the second client receives the synchronization message, it takes the commands that are included in the message and applies them to the web site.

Existing co-browsing applications, such as that described in the above-mentioned document, generally make it possible to take the actions undertaken by one user on one or more web pages displayed on one browser and to reproduce them in the browser of at least one second user, however they do not enable a plurality of users to act interactively on the contents of the same web page. Furthermore, those applications generally require the web browsers of the participants to a co-browsing session to be initially connected to the same web site, i.e. to the same web address or "uniform resource locator" (URL).

SUMMARY OF THE INVENTION

The present invention proposes a technique for co-browsing web pages that provides better performance than previously known co-browsing techniques.

In a first aspect, the invention thus relates to a co-browsing method of sharing browsing on a web page displayed in a window of a first web browser executed in a first terminal, with at least one second web browser executed in a second terminal. In accordance with the invention, the method comprises:

A) the second browser obtaining a video stream that is being played back in the first terminal, the stream including the display data of the web page;

B) playing back the video stream in a playback zone included in a window of the second browser;

C) on detecting at least one action triggered by a user of the second terminal and applied to at least one graphics element displayed within the playback zone, obtaining information about the location of the action by evaluating the position of the graphics element relative to a reference frame associated with the display zone of the web page in the window of the first browser, which zone is referred to as the "active" zone of the first browser;

D) transmitting a message to the first browser, which message includes an action type associated with the detected action together with the information about the location of the action; and E) applying the action to the web page in the window of the first web browser as a function of the content of the message.

The characteristic whereby the web page read in the first browser is shared by sending to the second browser the video stream for displaying the web page in the first browser makes it possible to guarantee that the content of the shared web page as seen by the first user is identical to that seen by the second user.

Specifically, and in prior solutions where all of the users must begin by loading the web page in their own browsers, it can happen that a browser personalizes the display of the web page, e.g. by using cookies or by having different settings, thereby leading to display disparities between the web browsers. That can be troublesome, for example in an application of the invention to a customer-adviser service platform, when the adviser does not see exactly the same content as the customer.

Furthermore, by means of the invention, because of the video stream being played back in the playback zone included in a window of the second user's browser, the second user can see the actions carried out by the first user on the content of the web page (above-mentioned steps A) and B)). Furthermore, conversely, the second user can transmit to the first browser actions that the second user has triggered on the content of the web page as played back in the second user's browser, which actions are then genuinely executed by the first browser in response to the received messages. The result of executing actions in the first browser can then be seen almost immediately by the second user because of the video stream that is being received continuously in the second terminal (steps C) to E))

Thus, in the co-browsing method of the invention for sharing a web page the users involved in sharing the web page can act interactively on the content of the web page.

Finally, according to the invention, the commands or actions that the second user can execute are not limited to those defined by the displayed content of the shared web page (e.g. action buttons or hypertext links), it being equally possible for these actions to be defined by a JavaScript™ type web application that has previously been loaded into the second browser, e.g. in order to propose actions such as underlining, overlining, sketching, drawing boxes, etc. These actions being executable in the first browser (after receiving action messages) only on condition that it has previously loaded, together with the shared web page, a JavaScript type web application configured to execute them.

In another particular implementation of the invention, the first and second web browsers are browsers that are compatible with the WebRTC standard (described in greater detail below). In this implementation, in step A), the video stream played back in the first terminal is transmitted continuously from the first browser to the second browser using a transmission protocol in compliance with the WebRTC standard.

Unlike numerous prior art co-browsing applications, by using web browsers that are WebRTC compatible for performing the invention, it is not necessary to install a specific application in the terminals of the users, nor is there any need to add an external extension module (e.g. a plug-in) to each web browser, where designing, testing, updating, and deploying such modules is complex and expensive, and where downloading and installing them can lead to errors and to annoyance for the user.

According to particular characteristics of the invention:
step A) includes the first web browser creating reference data characteristic of the active zone of the first web browser, and continuously transmitting to the second terminal the video stream as played back in the first terminal, together with the reference data;
step B) includes obtaining first position coordinates relating to the reference data relative to the playback zone of the video stream;
in step C), obtaining information about the location of the action includes:
obtaining second position coordinates relating to the action relative to the playback zone; and
obtaining third position coordinates relating to the action relative to the active zone of the first browser as a function of the first and second position coordinates, the third position coordinates forming the information about the location of the action.

Thus, because of the above-mentioned characteristics, the invention uses a mechanism that is simple and ingenious for controlling the execution in the first terminal of an action triggered by the second user in the second terminal and relating to a graphics element of the shared web page. This mechanism is based on the second browser evaluating the location of an action in the playback zone of the video stream relative to the reference data characteristic of the active zone of the first browser and transmitted in the video stream in order to cause the same action to be executed on the graphics element of the shared web page after the result of the above-mentioned evaluation has been sent to the first browser in a message.

According to other implementation characteristics of the invention:
in step A), the reference data is obtained from at least one component displayed in the web page at a point representing the origin of a reference frame associated with the active zone of the first browser.
in step B), the first position coordinates are obtained after capturing an image displayed in the playback zone and then identifying, from the captured image, the position of each component relative to the playback zone.
In practice, the first position coordinates are obtained by:
sending the captured image to an image processing server device;
detecting at least one component; and
determining the locating coordinates of the component as a function of a locating reference frame associated with the playback zone, the locating coordinates forming the first position coordinates.

In the above-described implementation of the invention, in step C):
the second position coordinates are obtained by determining the locating coordinates of the action relative to the locating reference frame associated with the playback zone, which locating coordinates constitute the second position coordinates;
obtaining said third position coordinates comprises:
subtracting the first position coordinates from the second position coordinates; and
multiplying the result of the above subtraction by a factor that takes account of the resolution difference between the video stream played back in the first terminal and the video stream played back in the second terminal.

According to other implementation characteristics of the invention:
in step C), at least one action triggered by a user of the second terminal and applied to a graphics element displayed within the playback zone is detected by the code of a second web page previously loaded into the second browser.
prior to step A), the method includes each of the first and second browsers connecting to a messaging server on an Internet type network in order to access a co-browsing service; and the second browser sending a screen-sharing request to the first browser, followed by the request being accepted by the first browser.

The term "Internet type network" is used to mean a network based on the communication technologies implemented in the Internet, in particular the network NW may also be a business network, commonly referred to as an intranet.

The method of the invention for sharing a web page is performed by software applications (or computer programs) executed by the first and second browsers. In the selected implementation, these web applications are JavaScript type web applications that are incorporated in a web page that is downloaded beforehand by each of the browsers. For the first browser, this web application is preferably incorporated in the (HTML or XML) code of the web page for sharing.

Consequently, in a second aspect, the present invention relates correspondingly to a software application for performing a method of sharing browsing on a web page displayed in a window of a first web browser executed in a first terminal with at least one second web browser executed in a second terminal, the software application including code instructions that, on being executed by the second web browser, enable:
the second browser to obtain a video stream that is being played back in the first terminal, the stream including the display data of the web page;
the video stream to be played back in a playback zone included in a window of the second browser;
on detecting at least one action triggered by a user of the second terminal and applied to at least one graphics element displayed within the playback zone, information about the location of the action to be obtained by evaluating the position of the graphics element relative to a reference frame associated with the display zone of the web page in the window of the first browser; and
a message to be transmitted to the first browser, the message including an action type associated with the detected action and the information about the location of the action so as to enable the action to be applied to the web page in the window of the first browser as a function of the content of the message.

Likewise, in a third aspect, the invention relates correspondingly to a software application for performing a method of sharing browsing on a web page displayed in a window of a first web browser executed in a first terminal with at least one second web browser executed in a second terminal, the software application including code instructions that, on being executed by the second web browser, enable:

the first browser to create reference data characteristic of the display zone of the web page in the window of the first browser, which zone is referred to as the "active" zone of the first browser, and the video stream that is being played back in the first terminal to be transmitted continuously to the second terminal together with the reference data;

a message to be received from the second browser, the message including firstly an action type associated with an action triggered by a user of the second terminal and applied to at least one graphics element displayed within a playback zone for the video stream in the second terminal, and secondly information about the location of the action as obtained by evaluating the position of the graphics element relative to the reference data; and the action to be applied to the web page in the window of the first web browser as a function of the content of the message.

In practice, the above-mentioned software applications are constituted by functional blocks or modules performing the above-mentioned functions in each of the browsers in question. Although they preferably use a JavaScript type programming language, each module may use any programming language, and may comprise one or more programs in the form of source code, object code, or code intermediate between source code and object code, such as in a partially compiled form, or in any other desirable form.

Consequently, the invention also provides, for each of the software applications of the invention, a computer readable data medium including the code of the software application in question. Such a data medium may be constituted by any entity or device capable of storing such code. For example, the medium may comprise storage means such as a read only memory (ROM), for example a compact disk (CD) ROM or a microelectronic circuit ROM, or indeed removable storage means, such as a universal serial bus (USB) key, or magnetic recording means, such as a hard disk. Furthermore, such a software application of the invention may in particular be downloaded from a network of the Internet type.

In a last aspect, the present invention provides a web browser in which a software application as defined above is executed, and also a communications terminal in which such a web browser of the invention is installed.

The advantages procured up by a software application, a web browser, or a terminal, of the invention, are identical to those described above that are procured by a co-browsing method for sharing a web page, of the invention, and they are consequently not repeated here.

BRIEF DESCRIPTION OF THE FIGURES

Other characteristics and advantages of the present invention appear from the following detailed description, which refers to the accompanying drawings, in which.

DETAILED DESCRIPTION OF THE INVENTION

Figure 1:
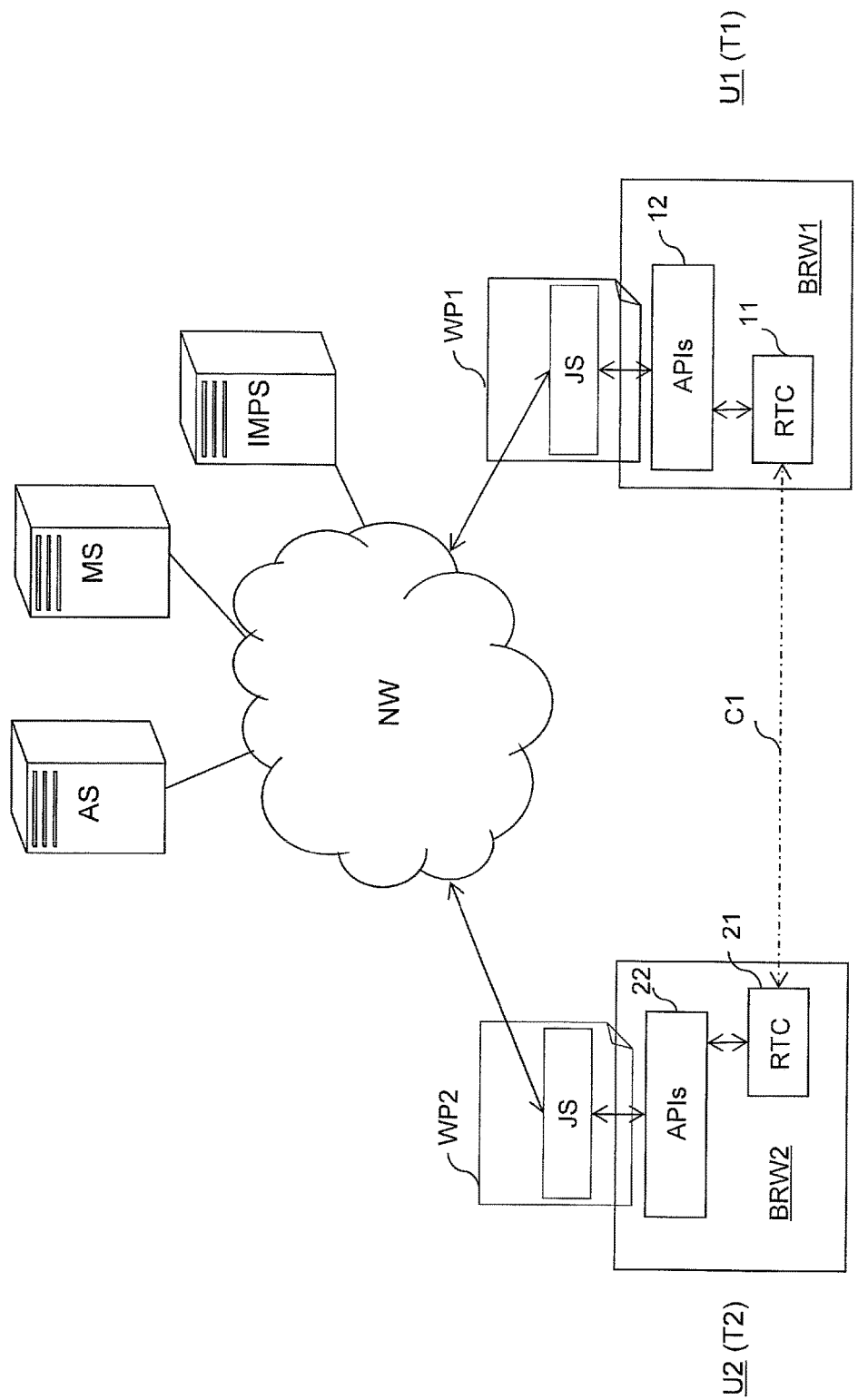
FIG. 1 shows a network environment in which the present invention is performed, in one implementation.

FIG. 1 shows a network environment in which the present invention is performed in one implementation.

The environment shown comprises a first web browser BRW1 of a first user terminal (T1, user U1), a second web browser BRW2 of a second user terminal (T2, user U2). The above-mentioned user terminals may connect to a communications network NW, which is a network of the Internet type, i.e. a network based on the communications technologies used in the Internet, in particular the network NW may also be a business network, commonly referred to as an "intranet".

In the selected implementation as shown, the browsers BRW1 and BRW2 are browsers that are compatible with a standard that is currently being standardized jointly by the worldwide web consortium (W3C) and the Internet engineering task force (IETF), and known to the W3C as web real-time communication (WebRTC) and to the IETF as RTCWEB.

It should be recalled that since the development of the hypertext markup language 5 (HTML5) new perspectives have become available to applications developers, with the possibility of making application programming interfaces (APIs) with web applications accessible in standardized manner within a browser. This is the path being followed by the IETF and the W3C in the RTCWEB/WebRTC standard that seeks to provide two types of specification:

a specification of protocols, undertaken by the IETF; and
a JavaScript API specification undertaken by the W3C.

The two above-mentioned specifications seek to provide an environment in which a JavaScript application incorporated in any web page that is read by any compatible browser and that is appropriately authorized by its user is capable of setting up communication that uses audio and video (together with auxiliary data), without the platform of the browser limiting the types of application in which such communications functions can be used.

According to the RTCWEB/WebRTC standard, referred to below as WebRTC for simplification purposes, a web browser needs to implement three API interfaces in order to be capable of receiving and transmitting data in streaming mode, which APIs are the following:

MediaStream: enabling the browser to access data streams such as those coming from the webcam and the microphone of the user's terminal;

RTCPeerConnection: makes audio or video calls with mechanisms for encryption and bandwidth management; and RTCDataChannel: provides peer-to-peer communication of generic data.

In order to obtain more information about the RTCWEB/WebRTC specifications, it is possible in particular to consult the following documents:

WebRTC 1.0: real-time communication between browsers—W3C editor's draft 22 Mar. 2013—accessible on the Internet at the following address: http://dev.w3.org/2011/webrtc/editor/webrtc.html#rtcpeerconnect-interface Overview: real-time protocols for browser-based applications—draft-ietf-rtcweb-overview-06—Feb. 20, 2013—accessible on the Internet at the following address: http/:datatracker.ietf.orga/doc/draft-ietf-rtcweb-overview/

At present, the publishers of web browsers are making experimental versions available of this new service between browsers, e.g. Google for the Chrome™ browser, and Mozilla with the Firefox™ browser.

In general manner, when a first user of a web WebRTC-compatible web browser seeks to set up an audio or video call from that browser to a second user on the Internet, the first user begins by making a connection with the browser to an application server that provides the WebRTC communication service. After a possible authentication operation, the browser acts via a web page to load the web application (JavaScript application) in compliance with the RTCWEB applications and adapt it to interact with the above-mentioned APIs (in compliance with the WebRTC specifications) that are natively incorporated in the browser.

Thereafter, using the connection web page with the application server, the first user selects an identifier for the second user and then enters a command—e.g. by clicking on an action button displayed in the web page open in the browser—in order to launch the audio or video call to the second user. Typically, the web page open in the browser then displays a message indicating that the connection is being set up. If the second user, the destination of the call, is also connected to the same WebRTC communication service supplied by the application server, then the second user can accept the call from the first user, e.g. an audio or video call, and communication can then be set up.

In FIG. 1, the browsers BRW1 and BRW2 are WebRTC compatible, so they have respective sets 12 and 22 of API interfaces in compliance with the WebRTC specifications, and respective RTC functional modules 11 and 21 in compliance with the RTCWEB specifications. The sets 12 and 22 of APIs are suitable respectively for interacting with respective JavaScript applications JS incorporated in the web pages WP1 and WP2 downloaded respectively by the browsers BRW1 and BRW2 at a web address of resources hosted by an application server AS on the network NW. In compliance with the WebRTC/RTCWEB specifications, the application JS provides RTC communication functions, in particular relating to accessing the WebRTC real-time communication service supplied by the server AS and to the signaling that makes it possible to set up such a call between browsers. Thus, in the example shown in FIG. 1, if each of the two browsers BRW1 and BRW2 has downloaded the web page (WP1 or WP2) containing the application JS of the WebRTC service, they can then set up a peer-to-peer real-time call C1, in particular a voice or video type call.

Still with reference to FIG. 1, the network environment of the invention also has a messaging server MS enabling the web pages WP1 and WP2 to communicate with each other via their respective JavaScript applications JS. In practice, in the implementation described, this is an extensible messaging and presence protocol (XMPP) server—e.g. a high performance instant messaging server known under the name ejabberd—that makes use of the XMPP protocol on top of HTTP. The network environment also has an image processing server IMPS used by the web browser BRW2 for using a video stream received from the browser BRW1 in order to identify the position of a component that is characteristic of the display zone of the web page WP1 in the window of the browser BRW1.

Figure 2:
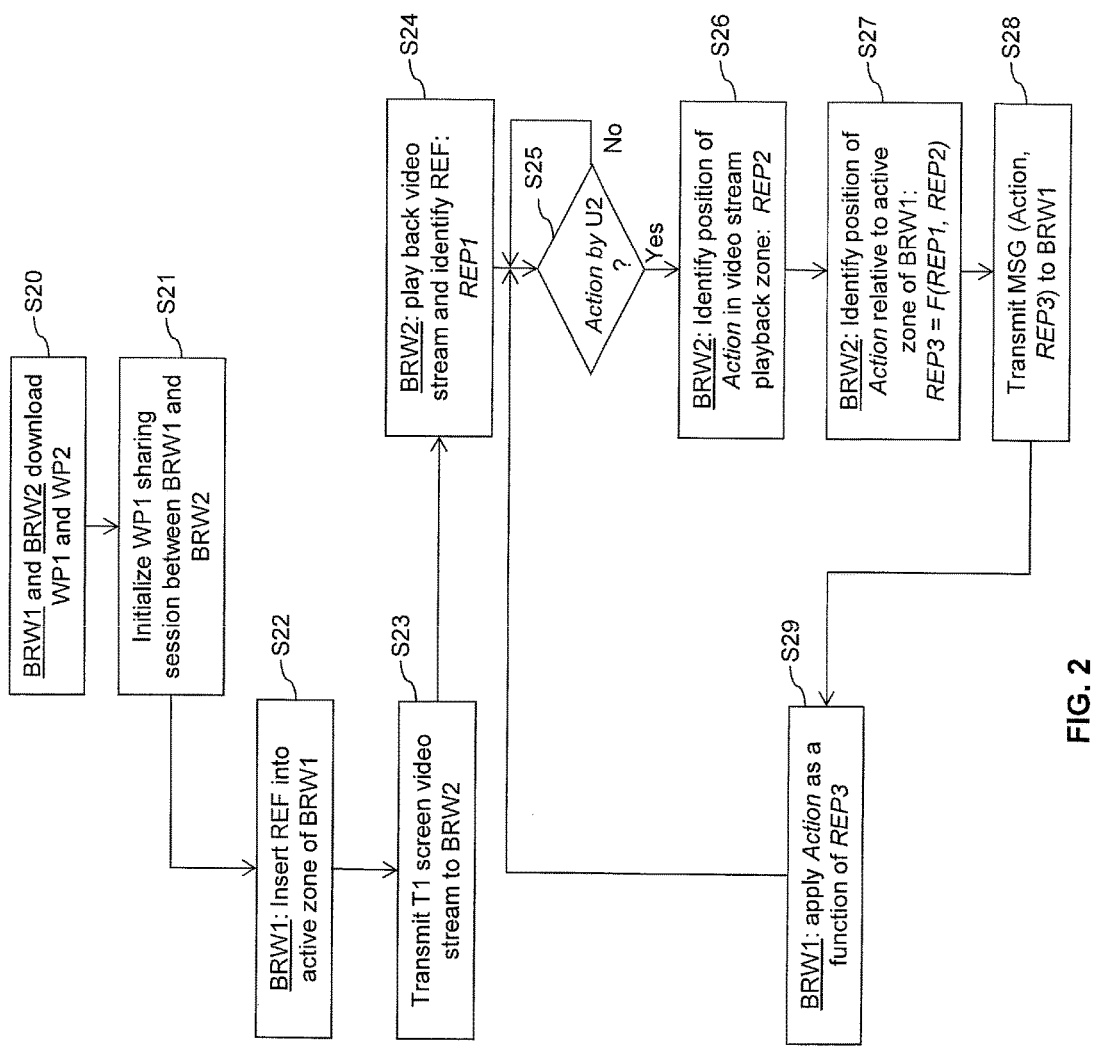
FIG. 2 is in the form of a flow chart showing the main steps of a method of the invention for co-browsing a web page.

FIG. 2 is in the form of a flow chart showing the main steps of a method of the invention for co-browsing on a web page as performed in a network environment of the kind shown in FIG. 1.

The method of the invention for co-browsing begins with a step S20 during which the users U1 and U2 connect via their respective browsers BRW1 and BRW2 to a web site corresponding to a services platform hosted by an application server AS, e.g. an after-sales service platform for establishing communication between a customer (user U2) and a remote adviser (user U1). In order to put the users U1 and U2 into communication with each other, the browsers BRW1 and BRW2 download respective web pages WP1 and WP2 containing code (HTML or XML) that includes a JavaScript application JS configured in accordance with the invention. Thereafter, from the web pages WP1 and WP2 displayed in their respective browsers, the users U1 and U2 authenticate themselves by a conventional procedure based on an identifier and a password. Once the users have been authenticated, then web pages are registered with the messaging server MS, thus making it possible to set up a communications session (e.g. by instant messaging) between the web pages WP1 and WP2. Each of the browsers being connected to the messaging server MS makes it possible to access the co-browsing service in the following manner (step S21).

In step S21, the user U2 clicks on a graphics element displayed by the web page WP2, thereby causing a message to be sent via the messaging server MS to the browser BRW1 requesting co-browsing of the web page WP1. The browser BRW1 receives the request and if the user U1 accepts it (e.g. by clicking on a button), then a response is transmitted to the messaging server, which then relays it to the browser BRW2. A session of co-browsing the web page WP1 is then initiated directly between the browsers BRW1 and BRW2.

In step S22, in the browser BRW1, the JavaScript application JS of the web page WP1 inserts reference data, referenced REF, in graphical form that is characteristic of the display zone of the web page WP1 in the window of the browser BRW1, referred to as the active zone of the browser BRW1.

In a step S23, a WebRTC signaling session is set up between the two browsers, and the video stream being played back on the screen of the terminal T1, including the reference data REF, is duplicated and transmitted continuously to the browser BRW2 via the WebRTC signaling session. In a step S24, the video stream is received continuously by the browser BRW2 and is played back in a playback zone included in a window of the browser BRW2. The reference data REF is then detected and first position coordinates REP1 are obtained that relate to the reference data relative to the playback zone of the video stream.

The application JS of the web page WP2 is configured to detect an action (e.g. a mouse click) of the user U2 applied to a component displayed within the playback zone of the video stream received from the browser BRW1. In a step S25, if such an action of the user U2 is detected, then in a step S26, the browser BRW2 proceeds to identify the position of the detected action, i.e. determine second position coordinates (REP2) of the component on which the action is taken (e.g. a mouse click) relative to the playback zone of the video stream.

In the following step S27, the position of the detected action is identified relative to the active zone of the browser BRW2, with third position coordinates (REP3) thus being obtained as a function of the above-mentioned first and second position coordinates (REP1 and REP2). In a step S28, a message (MSG) is sent from the browser BRW2 to the browser BRW1 via the messaging server MS, this message containing information about an action type in association with the detected action, together with the third position coordinates (REP3) as previously obtained (step S27).

Finally, in the step S29, now that the browser BRW1 has received the message MSG, the JavaScript application JS of the web page WP1 determines firstly the action that is to be reproduced and, on the basis of the coordinates REP3, it determines secondly the place where the action is to be executed in the display zone of the web page (WP1) in the window of the browser BRW1.

Once the action has been executed in the browser BRW1, the video stream transmitted continuously to the browser BRW2 reproduces the result of the action in the playback zone of the window of the browser BRW2. If a new action of the user U2 is detected (S25), then the process described above with reference to the steps S26-S29 is performed once more.

Figure 3:
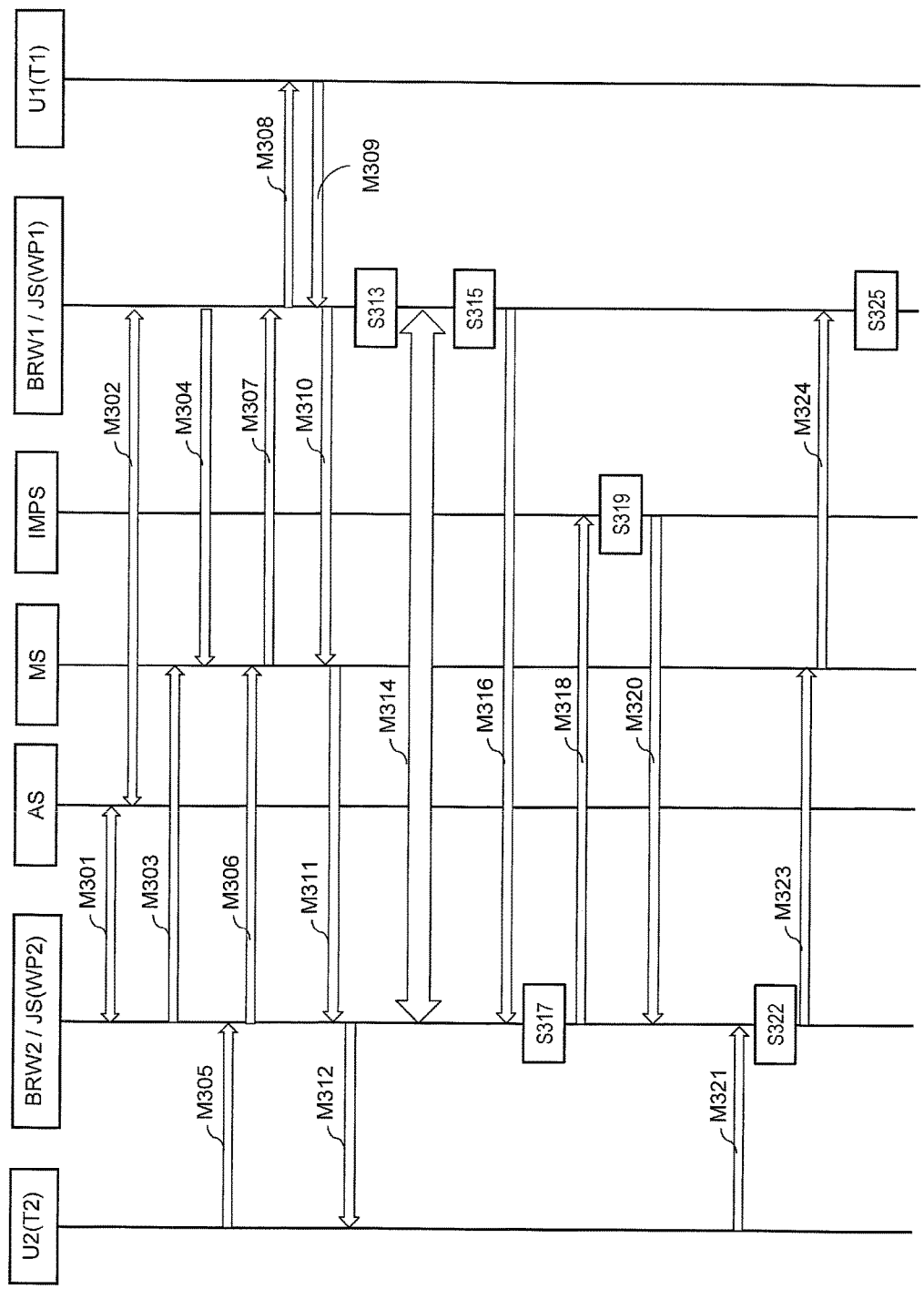
FIG. 3 is a chart showing the exchange of messages in the FIG. 1 network environment for the purpose of performing a method of the invention for co-browsing a web page.
Figure 4:
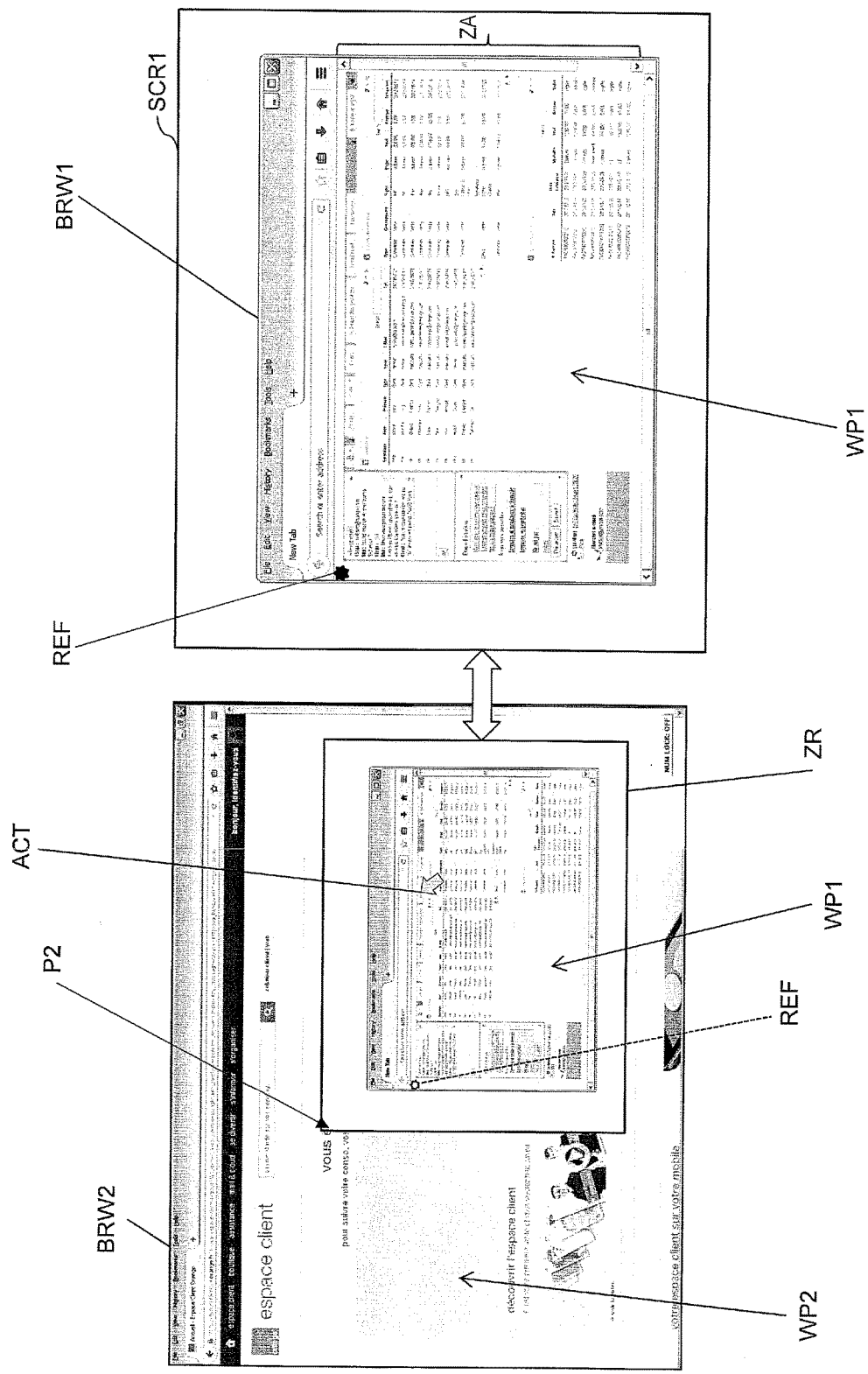
FIG. 4 shows an example of the screens of two web browsers while sharing a web page in accordance with the co-browsing method of the invention.

FIG. 3 is a chart showing the messages exchanged in the network environment of FIG. 1 in order to perform a method of co-browsing a web page in an implementation of the invention. FIG. 4 shows an example of the screens of two web browsers while co-browsing a web page using the co-browsing method in accordance with the invention.

As shown in FIG. 3, the exchanges take place between the various entities described with reference to FIG. 1, namely: the two browsers BRW1 and BRW2, as used by the two users U1 and U2; the JavaScript applications (JS) associated with the web pages WP1 and WP2 as previously downloaded by the browsers; the application server AS; the messaging server MS; and the image processing server IMPS.

The exchanges M301 and M302 correspond to the browsers BRW1 and BRW2 connecting to the server AS that makes it possible to access the screen sharing service and to download respective web pages (WP1, WP2), each including a JavaScript type application (JS) configured to perform a method of the invention. The active windows of the browsers BRW1 and BRW2 are shown in FIG. 4, respectively displaying the web pages WP1 and WP2. In the example of FIG. 4, it can be seen that the window of the browser BRW1 is not displayed in full screen mode on the screen SCR1 of the terminal of the user U1, whereas the window of the browser BRW2 is displayed in full screen mode.

The exchanges of messages M303 and M304 correspond to registering the web pages WP2 and WP1 with the messaging server MS, i.e. connecting them to the messaging server. This registration may be performed using an identifier (login), and possibly also a password, associated with each of the web pages. With a different implementation, registration may be anonymous. Once the web pages WP1 and WP2 are registered they can exchange information. Thus, at M305, the user U2 (e.g. a customer) makes a request to share the screen of the terminal (T1) of the user U1 (e.g. a remote adviser). For this purpose, the user U2 triggers this request by interacting with the display of the web page WP2 (e.g. a mouse click on a graphics element), with this interaction triggering a command M306 to be sent by the JavaScript application JS (also referred to as a JavaScript component) that is associated with the web page WP2 (JS(WP2)). This command (M306) is sent automatically by the application JS(WP2) to the application JS(WP1) loaded in the browser BRW1, via a message M307 transmitted by the messaging server MS. On receiving the command representing the screen sharing request, the browser BRW1 causes a screen sharing authorization request to be displayed (M308), e.g. in the form of a pop-up window displaying a text message requesting the user U1 to share that user's screen. If the user U1 accepts (M309)—e.g. by a mouse click on an element displayed in the pop-up window—, then a response message (M310, M311) is generated and sent by the JavaScript application JS(WP1) loaded in the browser BRW1 to the browser BRW2 via the messaging server MS. The user U2 is then notified by the application JS(WP2) that the user U1 accepts screen sharing by means of a text message (M312) being displayed by the browser BRW2.

In practice, in the implementation described, the request messages (M306, M307) and the response messages (M310, M311) for screen sharing are constituted by code instructions in the JavaScript object notation (JSON) data format that are transmitted using the HTTP protocol.

The sharing request message has following format:

```
{
"action": "shareScreen",
"data": ""
}
```

The format of the response message (acceptance) is as follows:

```
{
"action": "shareScreenAccepted",
"data": ""
}
```

Once the user U1 has accepted the screen sharing request, the application JS(WP1) causes (step S313) reference data to be created in the browser BRW1, which data is characteristic of the display zone of the web page in the window of the browser, referred to as the "active zone" of the first browser. This active zone is given reference ZA in FIG. 4. In the implementation described, this reference data is constituted by a graphics component displayed in the web page WP1 at a location representing the origin of a reference frame associated with the active zone ZA of the browser BRW1. This location for the origin of the reference frame (point having the coordinates (0,0)) usually corresponds to the point situated at the top left border of the window of the active zone ZA. In FIG. 4, the graphics component is a star that is identified by the reference REF.

A WebRTC signaling session, M314, is then set up between the two browsers BRW1 and BRW2, this signaling using the session initiation protocol (SIP) for example. Thereafter, the application JS(WP1), in a step S315, recovers the video stream corresponding to the screen SCR1 of the terminal T1 and transmits it (M316) to the browser BRW2. The video stream is then received by the application JS(WP2) which causes it to be displayed (S317)—in practice by using an HTML <video> tag—inside the window displaying the web page WP2 in the browser BRW2, in a "playback" zone given the reference ZR in FIG. 4.

Still in step S317, the application JS(WP2) proceeds to identify the position of the reference graphics component (REF) in the video stream played back in the playback zone (ZR) in order to obtain first position coordinates. For this purpose, an image of the played back video stream is captured and the captured image is sent (M318) to an image processing server device (IMPS). An image of the video stream played back in the playback zone (ZR) may be captured, for example, by using an HTML5 <canvas> element.

In the implementation described, the server IMPS is a distinct server on the network (NW), however in other implementations, this server could be incorporated in the terminal T2 of the user U2, or indeed it could be incorporated in the machine hosting the messaging server MS or the application server AS (see FIG. 1).

Once the capture image has been received by the image processing server IMPS, it acts in a step S319 to analyze the captured image in order to detect the reference graphics component (REF) (or all of the graphics components if there is more than one). In the implementation described, the graphics component, such as a graphics symbol, is detected by using an algorithm known as "template matching", a technique that makes it possible to search in an image for a small portion of the image that corresponds to a template image. Naturally, other algorithms could be used.

Once the reference graphic symbol or component (REF) has been identified in the captured image, still in step S319, the image processing server IMPS proceeds to calculate first position coordinates (X0, Y0) for the reference symbol (REF) relative to the playback zone (ZR) of the video stream. These first position coordinates represent the position of the reference symbol relative to an origin point forming a locating reference frame associated with the playback zone ZR. In practice, this origin point of the playback zone is the point situated at the top left border of the zone and is identified by reference P2 in FIG. 4. The coordinates (X0, Y0) of the reference component (REF) in the playback zone (ZR) are transmitted (M320) by the image processing server (IMPS) to the browser BRW2.

If the user U2 of the terminal T2 triggers an action ACT (M321), e.g. a mouse click, that is performed in correspondence with a graphics element, e.g. a URL link or an action button, as displayed by the video stream received from the browser BRW1 in the playback zone ZR, then the JavaScript application JS(WP2) of the browser BRW2 (in a step S322) determines information locating the action by evaluating the position of the graphics element associated with the action relative to a reference frame associated with the display zone (ZA) of the web page (WP1) in the window of the browser BRW1. Furthermore, an action type (click, select, draw, etc.) is identified by the code of the JavaScript application JS(WP2).

Calculation (step S322) of the above-mentioned information locating the action begins by calculating second position coordinates relating to the detected action (ACT) relative to the playback zone (ZR). These second position coordinates, written (X1, Y1), are obtained by determining the coordinates locating the graphics element corresponding to the action relative to the locating reference frame (P2) associated with the playback zone (ZR). Thereafter, calculation continues by obtaining third position coordinates relating to the action (ACT) relative to the active zone (ZA) of the browser BRW1, as a function of the first and second position coordinates (X0, Y0), and (X1, Y1). In practice, this amounts to changing the coordinates of the action in the playback zone from the reference frame having its origin at the point P2 to the reference frame having its origin at the point defined by the position of the reference component REF.

Thus, the first position coordinates (X0, Y0) are initially subtracted from the second position coordinates (X1, Y1), and then the result of the above subtraction is multiplied by a resolution factor f taking account of the resolution difference between the video stream played back in the first terminal T1 and the video stream played back in the second terminal T2, thereby obtaining the above-mentioned third position coordinates written (X, Y):

$X=(X1-Y0)*f$ $Y=(Y1-Y0)*f$

By way of example, the resolution factor f may be obtained by calculating the ratio between the length of a determined side of the active zone (ZA) of the first browser BRW1 and the length of the corresponding side of the video playback zone (ZR) displayed by the second browser BRW2.

Once the information about the location of the action has been obtained—i.e. once the above-mentioned third position coordinates (X, Y) have been obtained—, this information is associated with the type of action that corresponds to the action that was detected, and both the location and the type information are then transmitted in the form of messages (M323, M324) from the second browser (BRW2) to the first browser (BRW1) via the messaging server MS. In the above-described implementation, the messages containing the information about the action (M323, M324) are messages exchanged using the XMPP protocol and having a format of the type {"action": " ", "data", " "}.

There follows an example of a message corresponding to an action triggered by a mouse click associated with coordinates (20, 40) expressed in terms of pixels:

```
{
 "action":  "click",
 "data":    {
            "X": 20;
            "Y": 40
            }
}
```

Returning to FIG. 3, once the message (M324) has been received by the browser BRW1 in step S325, the application JS associated with the web page WP1 displayed by the browser BRW1 uses the information contained in the message to execute the action defined by the type and its associated coordinates on the web page WP1. For example, if the action is a click and if the coordinates (X, Y) correspond to a hypertext link pointing to a web address (URL), then the click is executed and the content corresponding to the web address is displayed by the browser BRW1.

The video stream transmitted in continuous manner from the browser BRW1 to the browser BRW2 consequently reproduces the result of each action initiated by the user U2, thus enabling that user to see the display of the result of his or her own actions on the video of the shared web page WP1, as played back in the playback zone (ZR) displayed on the browser BRW2.

In the implementation described, the action notification messages transmitted from the browser BRW2 to the browser BRW1 are transmitted using the XMPP protocol via the messaging server MS, nevertheless, in other implementations, this transmission may take place via the data channel of the WebRTC session set up between the two browsers.

Furthermore, in the example as described and illustrated, the sharing of a web page (WP1) is described as taking place between two users (U1, U2) in order to simplify the description, however the invention may be performed to share a web page between a first browser and a plurality of second browsers, using the operating mechanism described above and applied to each of the second browsers.

The invention claimed is:

1. A co-browsing method for sharing browsing on a web page displayed in a window of a first web browser executed in a first terminal, with at least one second web browser executed in a second terminal, the method comprising:
   A) inserting reference data, using a JavaScript application, into the first web browser;
   B) the second browser obtaining a video stream that is being played back in the first terminal and that is continuously transmitted by the first terminal to the second terminal using a transmission protocol in compliance with the WebRTC standard, said video stream including display data of the web page;
   C) playing back the video stream in a playback zone included in a window of the second browser;
   D) on detecting at least one action triggered by a user of the second terminal and applied to at least one graphics element displayed within the playback zone, obtaining information about the location of the action by evaluating the position of said graphics element relative to a reference frame associated with the display zone of said web page in the window of the first browser, which zone is referred to as the "active" zone of the first browser;
   E) transmitting a message to the first browser, which message includes an action type associated with the detected action together with said information about the location of the action; and
   F) applying said action to said web page in the window of the first web browser as a function of the content of said message.

2. A method according to claim 1, wherein:
   step A) includes the first web browser creating reference data characteristic of said active zone of the first web browser, and step B) includes continuously transmitting to the second terminal the video stream as played back in the first terminal, together with said reference data;
   step C) includes obtaining first position coordinates relating to the reference data relative to the playback zone of the video stream.

3. A method according to claim 2, wherein in step D), obtaining information about the location of the action includes:
   obtaining second position coordinates relating to said action relative to the playback zone; and
   obtaining third position coordinates relating to said action relative to said active zone of the first browser as a function of said first and second position coordinates, said third position coordinates forming said information about the location of the action.

4. A method according to claim 3, wherein in step A), said reference data is obtained from at least one component displayed in the web page (WP1) at a point representing the origin of a reference frame associated with the active zone of the first browser.

5. A method according to claim 4, wherein in step C), said first position coordinates are obtained after capturing an image displayed in said playback zone and then identifying, from the captured image, the position of each component relative to said playback zone.

6. A method according to claim 5, comprising:
   sending the captured image to an image processing server device;
   detecting at least one component; and
   determining the locating coordinates of said component as a function of a locating reference frame associated with said playback zone, said locating coordinates forming said first position coordinates.

7. A method according to claim 6, wherein, in step D), said second position coordinates are obtained by determining the locating coordinates of said action relative to the locating reference frame associated with said playback zone, which locating coordinates constitute said second position coordinates.

8. A method according to claim 7, wherein, in step D), obtaining said third position coordinates comprises:
   subtracting said first position coordinates from said second position coordinates; and
   multiplying the result of the above subtraction by a factor that takes account of the resolution difference between the video stream played back in the first terminal and the video stream played back in the second terminal.

9. A method according to claim 8, wherein the first and second web browsers are browsers compatible with the WebRTC standard.

10. A method according to claim 7, wherein the first and second web browsers are browsers compatible with the WebRTC standard.

11. A method according to claim 6, wherein the first and second web browsers are browsers compatible with the WebRTC standard.

12. A method according to claim 5, wherein the first and second web browsers are browsers compatible with the WebRTC standard.

13. A method according to claim 4, wherein the first and second web browsers are browsers compatible with the WebRTC standard.

14. A method according to claim 3, wherein the first and second web browsers are browsers compatible with the WebRTC standard.

15. A method according to claim 2, wherein the first and second web browsers are browsers compatible with the WebRTC standard.

16. A method according to claim 1, wherein the first and second web browsers are browsers compatible with the WebRTC standard.

17. At least one non-transitory computer-readable medium comprising at least one software module stored thereon and comprising program instructions the execution thereof by at least one computer processor implementing a method of sharing browsing on a web page displayed in a window of a first web browser executed in a first terminal with at least one second web browser executed in a second terminal, wherein the method on being executed by the second web browser, enables:
   reference data to be inserted into the first web browser using a JavaScript application;
   the second browser to obtain a video stream that is being played back in the first terminal and that is continuously transmitted by the first terminal to the second terminal using a transmission protocol in compliance with the WebRTC standard, said video stream including display data of the web page;

the video stream to be played back in a playback zone included in a window of the second browser;

on detecting at least one action triggered by a user of the second terminal and applied to at least one graphics element displayed within the playback zone, information about the location of the action to be obtained by evaluating the position of said graphics element relative to a reference frame associated with the display zone of said web page in the window of the first browser; and a message to be transmitted to the first browser, the message including an action type associated with the detected action and said information about the location of the action so as to enable said action to be applied to said web page in the window of the first browser as a function of the content of said message.

18. The at least one non-transitory computer-readable medium of claim 17 implemented on a communications terminal in which there is installed a web browser.

19. At least one non-transitory computer-readable medium comprising at least one software module stored thereon and comprising program instructions the execution thereof by at least one computer processor implementing a method of sharing browsing on a web page displayed in a window of a first web browser executed in a first terminal with at least one second web browser executed in a second terminal, wherein the method on being executed by the first web browser, enables:

the first browser to create reference data characteristic of the display zone of said web page in the window of the first browser using a JavaScript application, which zone is referred to as the "active" zone of the first browser, and the video stream that is being played back in the first terminal to be transmitted continuously to the second terminal together with said reference data using a transmission protocol in compliance with the WebRTC standard;

a message to be received from the second browser, the message including firstly an action type associated with an action triggered by a user of the second terminal and applied to at least one graphics element displayed within a playback zone for the video stream in the second terminal, and secondly information about the location of the action as obtained by evaluating the position of said graphics element relative to said reference data; and said action to be applied to said web page in the window of the first web browser as a function of said message.

20. The at least one non-transitory computer-readable medium of claim 19 implemented on a communications terminal.

* * * * *